United States Patent [19]

Cooper, Jr. et al.

[11] Patent Number: 4,688,327
[45] Date of Patent: Aug. 25, 1987

[54] SLEEVING OF TUBES OF STEAM GENERATOR

[75] Inventors: Frank W. Cooper, Jr., Monroeville Boro, Pa.; Bruce A. Howard, Inman, S.C.; David A. Snyder, N. Huntingdon Township, Westmoreland County, Pa.

[73] Assignee: Westinghouse Electric Corp., Pittsburgh, Pa.

[21] Appl. No.: 764,705

[22] Filed: Aug. 12, 1985

Related U.S. Application Data

[62] Division of Ser. No. 538,309, Oct. 3, 1983, Pat. No. 4,586,250.

[51] Int. Cl.$^4$ .................. B23P 15/26; B23P 19/00
[52] U.S. Cl. .......................... 29/726; 29/727; 29/723
[58] Field of Search .............. 29/157.4, 723, 726, 29/727, 402.03, 402.01

[56] References Cited

U.S. PATENT DOCUMENTS

| | | | |
|---|---|---|---|
| 4,213,239 | 7/1980 | Filer | 29/726 |
| 4,216,893 | 8/1980 | Galtthorn | 29/726 |
| 4,292,731 | 10/1981 | Filer | 29/726 |
| 4,312,124 | 1/1982 | Calhoun | 29/726 |
| 4,406,856 | 9/1983 | Wilkins | 29/402.03 |
| 4,571,821 | 2/1986 | Pirl et al. | 29/727 |
| 4,586,250 | 5/1986 | Cooper et al. | 29/727 |

Primary Examiner—Howard N. Goldberg
Assistant Examiner—Steven Nichols
Attorney, Agent, or Firm—H. Diamond

[57] ABSTRACT

Apparatus for processing the damaged tubes of a steam generator. This apparatus includes a sleeving tool for inserting sleeves in the tubes, a high-roller tool for rolling the sleeves at their upper ends where they have been expanded, and a low-roller tool for rolling the sleeves at their lower ends in the tube sheet. Each tool is provided with locking pins which engage tubes adjacent to a tube to be processed and suspend the tool in processing position. The sleeves are inserted in the tubes and are rolled by rolls driven by a hydraulic motor. For sleeve insertion and for high and low rolling, the motor is controlled by a servo control valve. The feedback signal to this valve is derived from a flow transducer in the feed line for the motor. The feedback for the force of sleeve insertion is the pressure across the motor derived from pressure transducers in the conductors through which the motor is supplied. For insertion speed and for rolling speed, the feedback is derived from a fluid-flow transducer. The passage of fluid through the servo valve is capable of varying continuously responsive the controlling error signal. The cage or roll tube and mandrel of the low roller are advanced into the sleeve by a piston of a hydraulic cylinder. The flow of fluid to the locking pins and to this hydraulic cylinder is controlled by a directional control valve.

10 Claims, 12 Drawing Figures

SLEEVING OF TUBES OF STEAM GENERATOR

CROSS-REFERENCE TO RELATED APPLICATION

This application is a division of application Ser. No. 538,309 filed Oct. 3, 1983 for SLEEVING OF TUBES OF STEAM GENERATOR, now U.S. Pat. No. 4,586,250, granted May 6, 1986 to Frank William Cooper and John P. Vogeleer for "Apparatus for Sleeving Tubes in Hostile Environments" and assigned to Westinghouse Electric Corporation is incorporated herein by reference (herein Cooper-Vogeleer).

BACKGROUND OF THE INVENTION

This invention relates to the art of repairing damaged tubes constituting part of a tube assembly. It has particular relationship to the repair, and specifically the sleeving, of the damaged tubes which conduct the coolant of a steam generator of a nuclear-reactor plant. The damage to the tubes is predominantly corrosion. This invention has unique utility in the repair of the damaged or corroded tubes of steam generators of such plants. It may have more general use, and to the extent that its principles are used more generally, such use in regarded within the scope of equivalents of this application or of any patent which may issue on or as a result thereof.

Access to repair damaged tubes is obtained through manways in the channel head of a generator. A tube sheet extends across the channel head and the tubes are welded into the tube sheet and open into the channel head. The access region under the channel head is radioactive and it is essential that the presence of personnel in this region be minimized. In addition, the channel head is composed of metal. To preclude hazard to personnel, it is necessary that no conductors carrying power at commercial voltages (110 volts) or higher be present within the channel head. Conductors operating at about 24 volts or the like may be present.

The sleeving of the tubes involves several processes. In the past, plugs were inserted in the corroded tubes of a steam generator to prevent the flow of radioactive coolant into the steam or feedwater. The plugging of a tube reduces the efficiency of the generator by a magnitude corresponding to the relative quantity of coolant carried by the plugged tube. Substantial loss of efficiency, in some cases of the order of 15%, has been experienced in nuclear-reactor plants in which a large number of the tubes were plugged. To overcome this economic loss it has become necessary to drill out the plugs and sleeve the tubes. A tool to drill out plugged tubes is provided for this purpose. A tool is also provided for inserting the sleeve blanks into damaged tubes, those that are drilled out as well as others. Once a tube is sleeved, it is desirable to secure the sleeve in the tube and to seal the region between the sleeve and tube against penetration of coolant or feedwater. This object is accomplished first by expanding the sleeve at its internal or upper end and in the portion of the sleeve in the tube sheet, i.e., at the lower end of the sleeve, and then by hard rolling the expanded sleeve at its rim and within the tube sheet. Expansion of the sleeve is disclosed in U.S. Pat. No. 4,513,502 granted Apr. 30, 1985 to John P. Vogeleer for "Measuring of Tube Expansion" and assigned to Westinghouse Electric Corporation. The upper and lower hard rolling are carried out by tools each including a roller which is inserted in the sleeve after the sleeve has been inserted in the damaged tube. The tool for upper hard rolling is sometimes referred to as the high hard roller and the tool for the lower hard rolling is referred to as a low hard roller. Each tool is provided with locking pins by means of which it is firmly suspended from the tube sheet. The locking pins engage tubes in the sheet which are adjacent to a tube being sleeved.

The drill, the sleeve-insertion tool, and the upper and lower hard rollers are driven by hydraulic motors mounted on each tool. The locking pins are driven and secured in the adjacent tubes hydraulically. The hazards of high voltage in the channel head are thus overcome. While hydraulic drives are preferred, occasions may arise where some or all of the above-described functions may be performed by pneumatic drives and the practice of this invention with pneumatic drives is contemplated as within its scope. Secondary operation, such as the raising of the high hard roller to the rolling position, are carried out by low voltage, usually 24 volt, to 28 volt motors.

It is necessary that a hydraulic or pneumatic servo control system be provided which shall control the above-described tools in a manner consistent with, and with the precision demanded by, the process requirement. Control systems in accordance with the prior art teachings which are available are single-purpose systems which are not suitable for use in the environment of the reactor plant and of the steam generator. It is an object of this invention to overcome the drawbacks of the prior art and to provide integrated apparatus for performing the above-described sleeving processes with the precision and under conditions required in a nuclear-plant containment environment.

SUMMARY OF THE INVENTION

In accordance with this invention, the sleeving processes are controlled by regulating the force applied by the hydraulic motors, to those of their associated tools requiring such regulations, by controlling the pressure impressed on the motors. The speed of the motors and of the mechanisms which they drive is regulated by controlling the fluid flow through the associated motors. This control of force and speed is effected through a hydraulic manifold whose operation is commanded and controlled by a computer through a hydraulic servo control unit (HSC). Such regulation and control is applied to the tool which inserts the sleeve, referred to as the sleeve inserter, the high and low hard rollers and the drill. In addition, the rate at which the drill penetrates into the plug is maintained constant.

It is essential that the locking pins of each tool be properly seated in the tubes adjacent the tube to be processed. Parent application Ser. No. 538,309 is directed to the proper seating of the locking pins.

Another aspect of this invention arises from the discovery that the force applied to insert a sleeve blank or tube or both or to the insertion tool. The desired control is achieved by regulating the fluid pressure supplied to the insertion motor. Pressure transducers are interposed in each conductor through which the motor is supplied, i.e., the feed conductor and the return conductor. Each transducer produces an electrical signal, typically a voltage, dependent on, typically proportional to, the pressure in its conductor. The absolute magnitude of the difference between these signals in a measure of the differential pressure across the motor and of the insertion force applied to the sleeve blank. This difference is a feedback signal which is compared to a command signal corresponding to the desired pressure on the motor. The resulting error signal is impressed on a servo control valve which controls the pressure in the fluid-supply conductors. The servo valve is bought from Moog, Inc. and is typically a Moog mode A076-103A or A0760-103A valve. Across such a valve, unlike a conventional hydraulic solenoid valve, the pressure drop varies continuously as a function of the impressed error signal, typically proportional to the error signal. The fluid pressure across the motor is thus continuously and closely controlled.

The electro-hydraulic control according to this invention also serves to regulate the sleeve-blank insertion velocity and the high and low hard roller speed. The insertion velocity of the sleeve blank is regulated to optimize productivity and the hard roller speed is regulated to preclude excessive cold working of the sleeve and tube material. The velocity or speed regulation is effected by reliance on the fluid flow or fluid feed as the feedback parameter. The fluid-flow velocity is measured by a flow transducer in the motor line. It produces an electrical signal which is compared to a command signal. The resulting error signal controls the flow through the motor by means of the servo-control valve. A fixed displacement hydraulic motor is used both for inserting the sleeve blank and for driving the high and low hard rollers. A fixed-displacement motor is a zero leakage motor. A fixed volume of fluid goes through the motor per revolution. For such a motor, the speed of rotation is proportional to the flow rate so that the flow, and through it, the velocity and speed are effectively controlled. This mode of motor speed control differs from conventional speed control, which relies on a tachometer signal for control. A tachometer must be mechanically coupled to the tool. The flow transducer can be, and in practice of this invention is, located in the manifold remote from the tool. Tool weight is thus reduced.

The feedback for the drill also includes the fluid flow or feed control. In addition, feedback from a tachometer controls the speed. The overall control is such that the chip-cut depth per revolution of the drill is maintained constant.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENTS AND METHOD

While the tools, operated in the practice of this invention, and their support are collateral to this invention, it is believed desirable to describe them to facilitate the understanding of this invention. The principle tools are the sleeve blank inserter, the lower hard roller and the upper hard roller. The drill for drilling out plugs is of secondary importance and will not be described in detail. The description follows.

Figure 1:
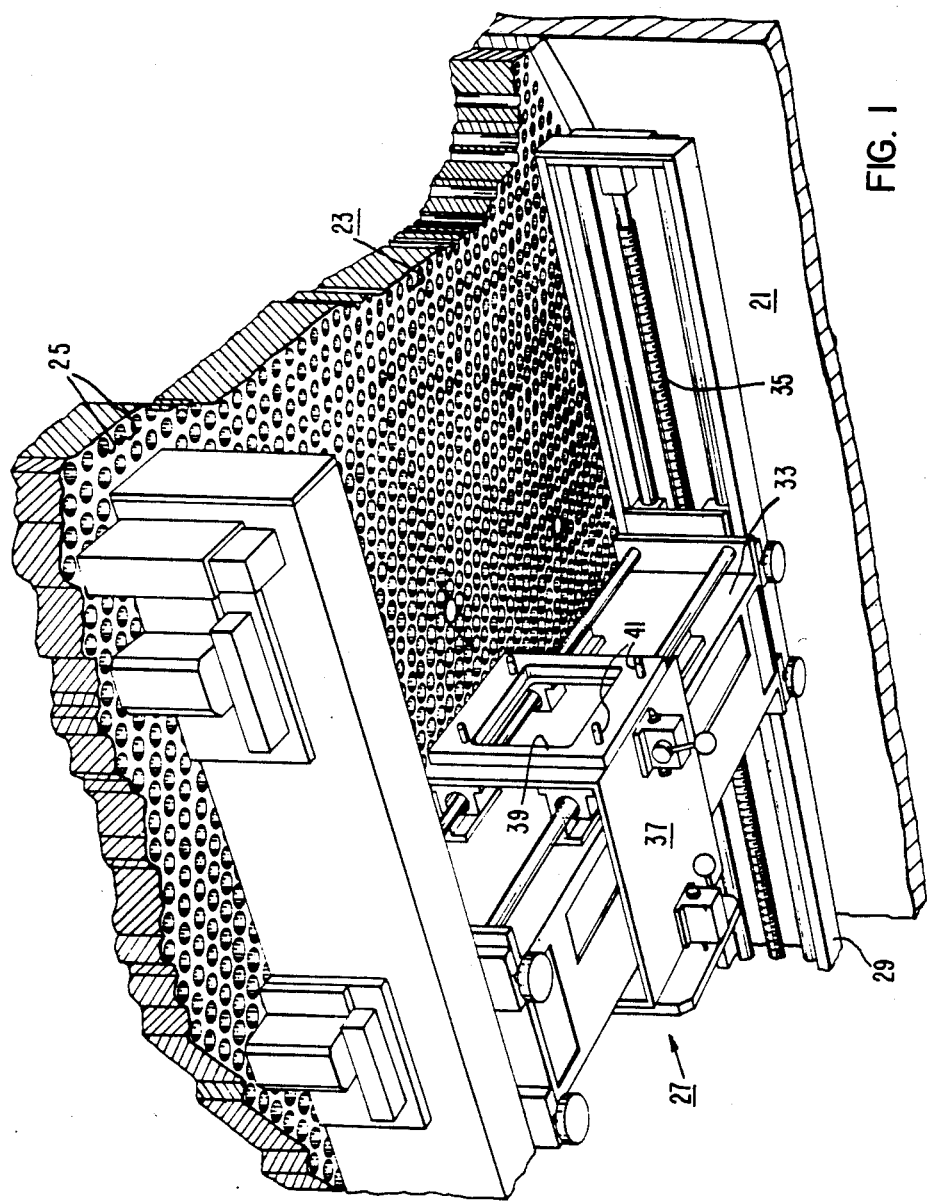
FIG. 1 is a copy of a photograph showing the manner in which the tools which carry out the processing of the damaged tubes are mounted within a channel head of a steam generator.

FIG. 1 shows a part of the interior of a channel head 21. A tube sheet 23 extends across the wall of the channel head. Throughout the sheet 23 there are tubes 25. To mount the tools for processing corroded tubes, a coordinate transport 27 is provided. The transport includes opposite parallel rails 29, (only one rail 29 shown). The rails are secured by locking pins (not shown) in tubes 25 in the tube sheet 23. A bridge 33 is movable by screws 35 along the rails. A carriage 37 is movable along the bridge 33 in a direction perpendicular to the rails 29 and the one not shown. The carriage has a plate 39 provided with pins 41 from which the respective tools are suspended.

Figure 2:
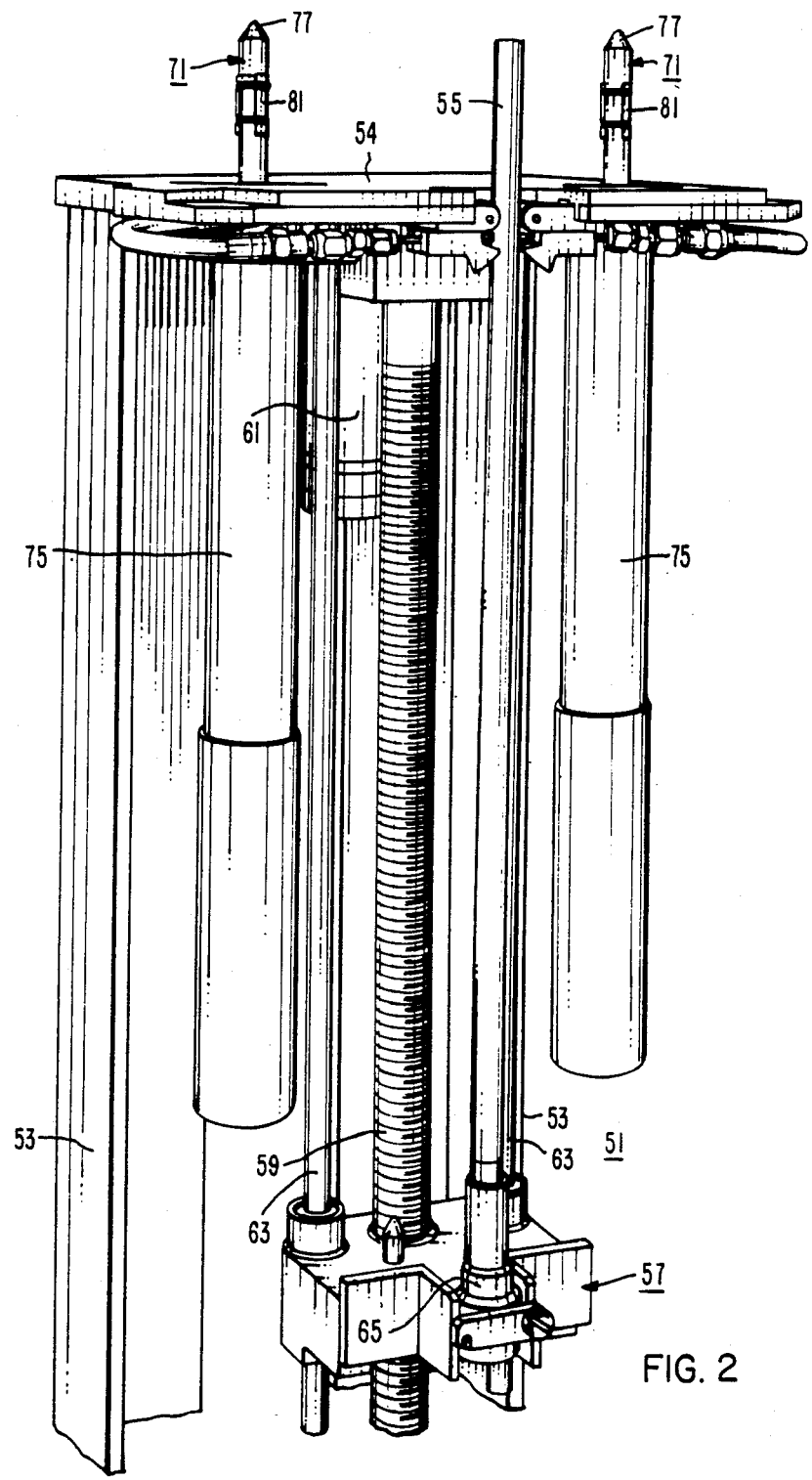
FIG. 2 is a copy of a photograph showing a sleeve blank insertion tool used in the practice of this invention with the mandrel which carries the sleeve retracted.
Figure 3:
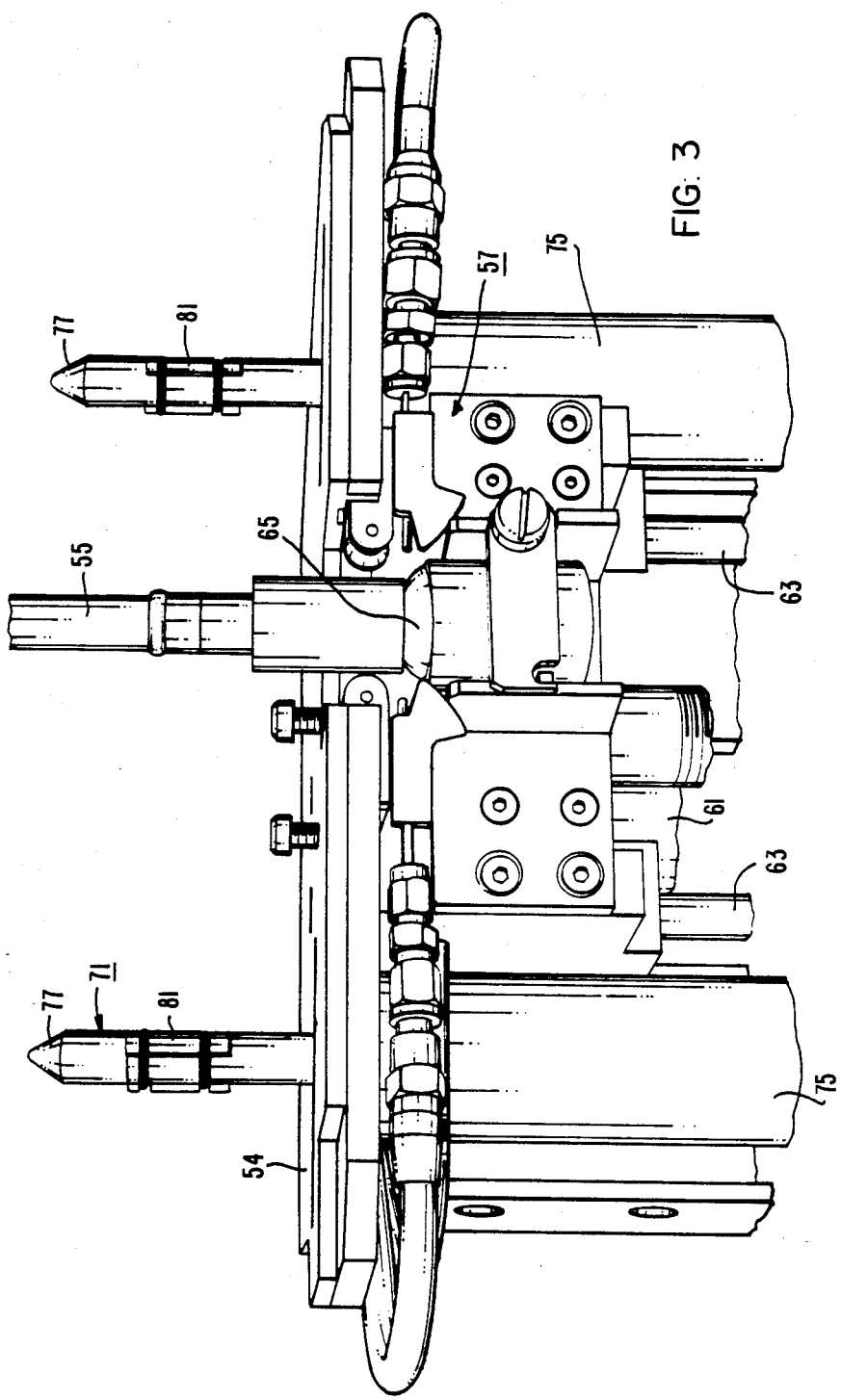
FIG. 3 is a copy of a photograph of this insertion tool with the mandrel in the uppermost position.

The inserter 51 (FIGS. 2, 3) for the sleeve blank 52 (FIG. 10A) includes a frame consisting of channels 53 to the top of which a plate 54 is secured. The plate 54 supports a vertical plate (not shown). The inserter is mounted on plate 39 of the carriage 37 (FIG. 1) by means of this vertical plate. The sleeve blank is mounted on a mandrel 55 which is carried by a bracket or carriage 57. The mandrel 55 and sleeve blank are raised and lowered by a lead screw 59 which is driven by a hydraulic motor 61 (FIG. 3) mounted on the channels 53 behind the mandrel 55 and lead screw 59. The bracket 57 contains a ball nut (not shown) which engages the lead screw 59. When the motor 61 rotates the lead screw 59, the bracket 57 is moved, on guide rods 63, vertically upwardly or downwardly, depending on the direction of rotation of the motor, carrying the mandrel and sleeve blank 52 with it. At the top the carriage 57 has a nipple 65 (FIG. 3). When the bracket is in the uppermost position, the nipple engages a cooperative member (not shown) which connects the inside of the mandrel to a high pressure fluid source (usually water). The water is transmitted through the mandrel to expand the upper portion of the sleeve and the lower portion within the tube sheet 23 after the sleeve blank is inserted in a tube 25. The surface of the expanded sleeve engages the contiguous wall of the tube. After the expansion the sleeve 52 is disengaged from the mandrel 55, the motor 61 is reversed, and the mandrel is withdrawn. The engagement of the sleeve 52 with the tube 25 where the sleeve is expanded prevents the sleeve from falling out of the tube 25. Typically, the upper end of the sleeve is expanded along a length of about 15¼ centimeters.

The sleeve inserter 51 (and also the other tools) includes locking pins 71. The pins 71 are moved upwardly and downwardly by piston rods 73 (FIG. 10A) of hydraulic cylinders 75. In the retracted position, the tips 77 of the pins 71 are just below the plate 54. The pins 71 are shown in the advanced position. In this position the pins 71 extend into tubes 25 adjacent the tube to be sleeved. Each pin 71 carries keys 81 below its tip. The operation of the pins 71 and the keys 81 is described in Parent Application Ser. No. 538,309.

Figure 4:
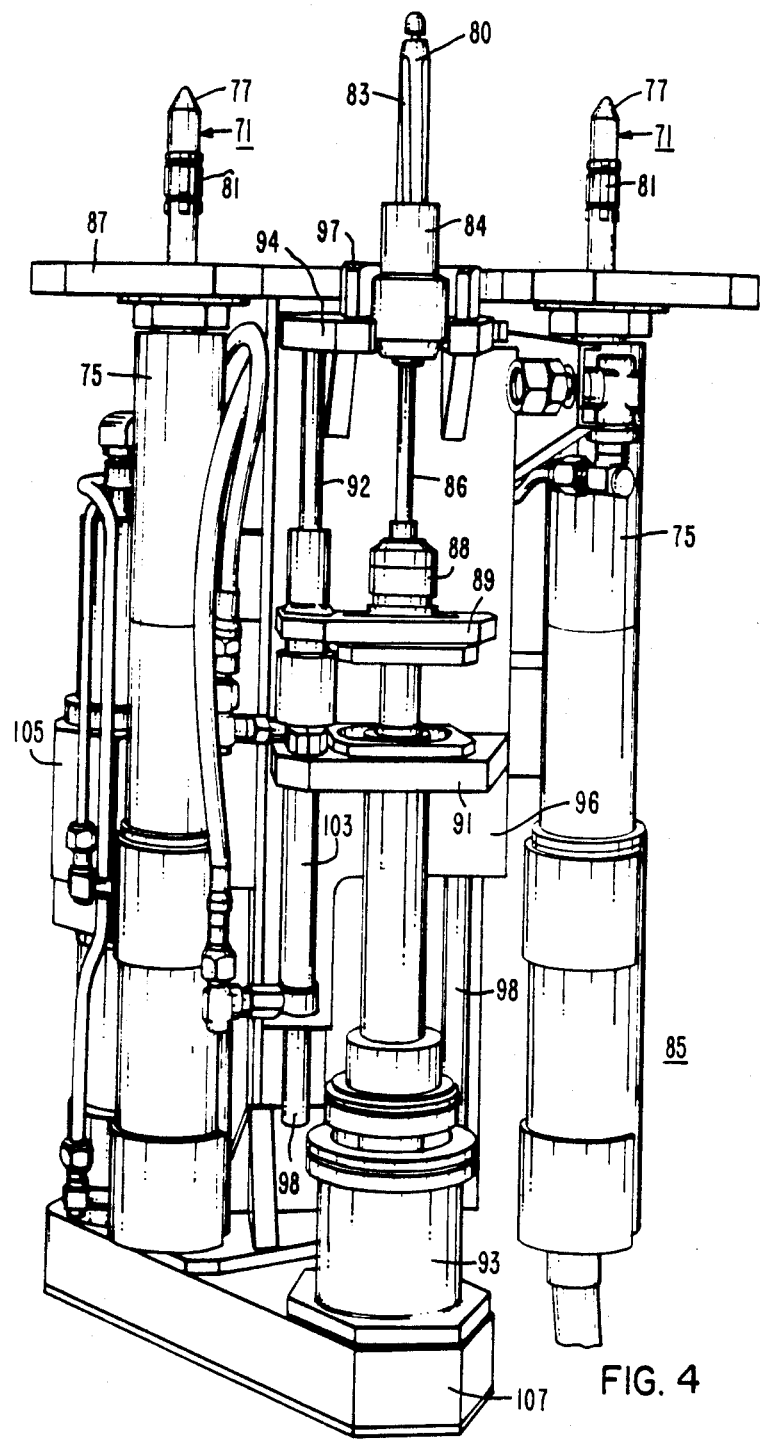
FIG. 4 is a copy of a photograph of the low hard-roller tool used in the practice of this invention with the telescoping mechanism for the tapered mandrel retracted so that the rolls of the roller are retracted from the surface of the cage.
Figure 5:
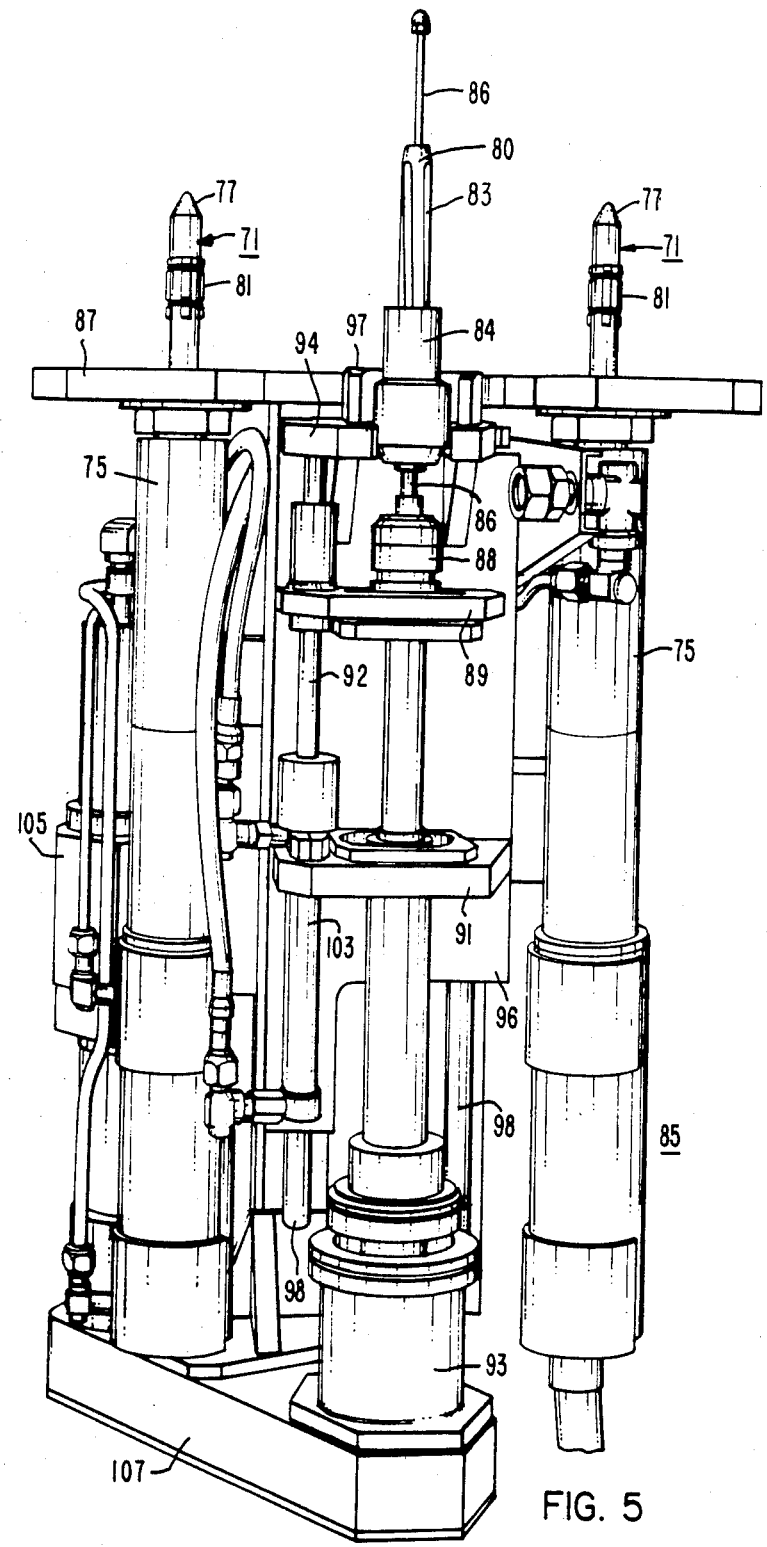
FIG. 5 is a copy of a photograph of this tool with the telescoping mechanism advanced so that the rolls are extended in rolling position.

Once the sleeve is positioned in the tube 25, the expanded portion of the sleeve within the tube sheet 23 is rolled by the lower rolls 83 (FIGS. 4 and 5) of tool 85. The reason for rolling this portion of the sleeve is to seal the sleeve to the tube 25.

Tool 85 includes a supporting frame (not shown see Cooper-Vogeleer) from the top of which a horizontal plate 87 extends. A plate (not shown) with keyhole slots for mounting the tool on plate 39 (FIG. 1) is supported by the horizontal plate 87. Locking pins 71 and their cylinders 75 are mounted on each side of the plate 87. These locking pins 71 operate in the same manner as the locking pins for the sleeve inserter 51 as disclosed in the parent application. The rolls 83 extend through a cage 80 (referred to as a "tube" in Cooper-Vogeleer) which extends from a chuck 84. A tapered mandrel 86 extends from another chuck 88 on upper table 89. The table 89 is slidable on guide rods 92 which are mounted between a plate 94 extending below clamp 97 and a lower table 91. The upper table 89, lower table 91 and the plate 94 are mounted on a carriage 96 which is movable on rails 98 vertically by a hydraulic cylinder 93. The plate or carriage 96 is movable from a lowermost position in which table 91 is just above cylinder 93 on the casing 107 to the position shown in FIG. 4. The upper table 89 is movable by the piston 268 of an air cylinder 103 from the lower position shown in FIG. 4 to the upper position shown in FIG. 5. In this position, the mandrel 86 extends through the roller cage 83 and cams out the rolls 83 of the roller cage 85. The mandrel 86 is rotated by a hydraulic motor 105 through gears (not shown) in casing 107. The hydraulic motor 105 is started when the upward movement at table 89 is started after the cage and mandrel have been inserted in a sleeve 52. This motor rotates the mandrel 86 when it is started. When the mandrel drives up, it rotates the rolls 83, rolling the sleeve 52 into tube 25 within the tube sheet 23 substantially sealing the sleeve to the tube 25. The rolling is stopped by deenergizing motor 105 when a reactive torque of a predetermined magnitude is impressed on the rolls by the sleeve, tube 25 and tube sheet 23. Thereafter the motor 105 is reversed retracting the mandrel 86. After the mandrel is retracted the cage 80 and mandrel are returned to their starting position.

Figure 6:
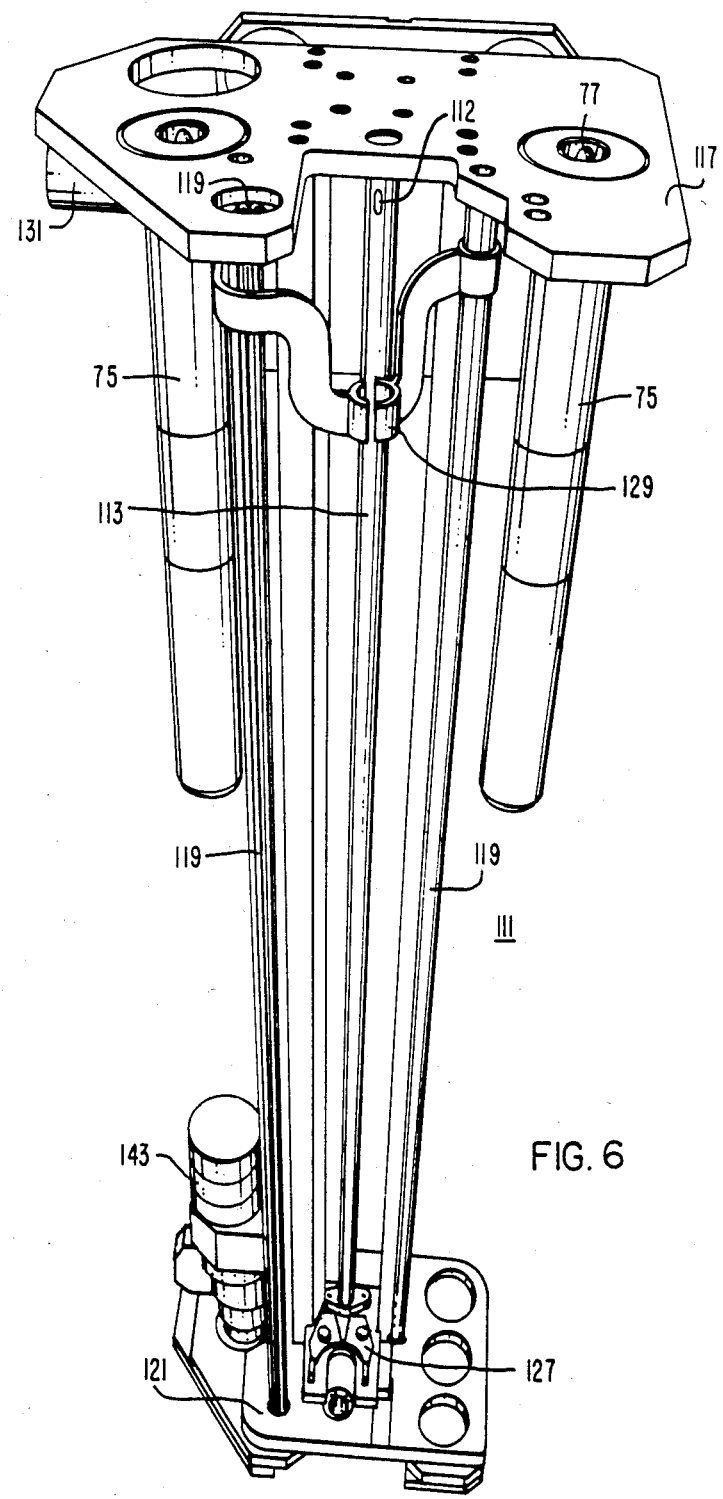
FIG. 6 is a copy of a photograph showing the upper hard roller in the retracted position.
Figure 7:
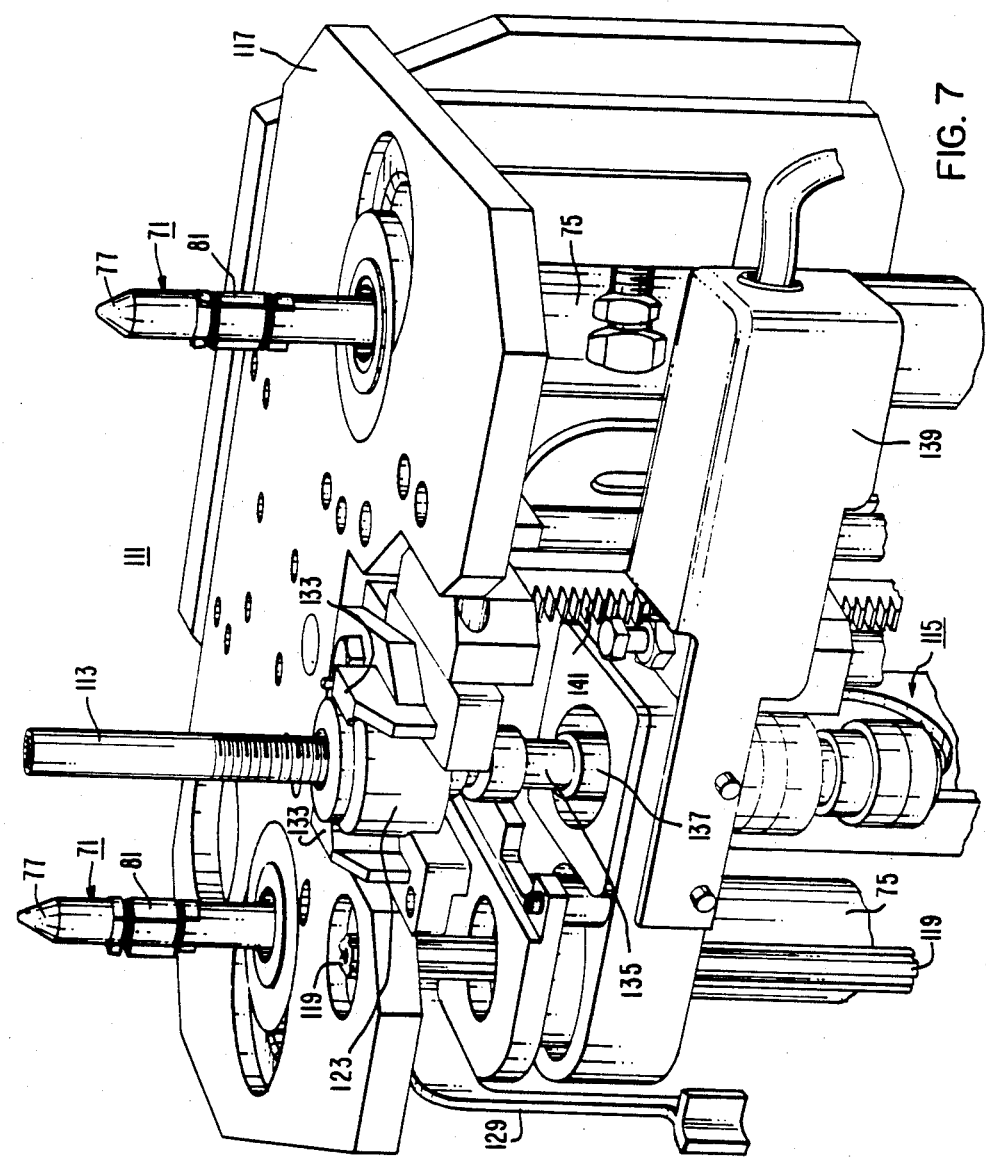
FIG. 7 is a copy of a photograph showing this roller in the rolling position.

The upper portion of the sleeve is rolled after the portion in the tube sheet 23. The tool 111 (FIGS. 6 and 7, also see Cooper-Vogeleer) for the upper rolls 112 which are in cage 113 (referred to as a tube in Cooper-Vogeleer) includes a frame 115. A horizontal plate 117 is mounted on the upper end of frame 115 (FIG. 7). The plate 117 supports a vertical plate (not shown) having keyhole slots for suspending the tool 111 from plate 39 (FIG. 1) of the coodinate transport 27. Splined rods 119 extend between horizontal plate 117 and a lower plate 121 (FIG. 6). The cage 113 is supported in a thrust collar or thrust bearing 123 (FIG. 7). In the retracted position of the upper roller, the cage 113 extends between the bracket or carriage 127 which is positioned just above lower plate 121 and top plate 117. The cage 113 is aligned and guided by fingers 129 which extend and are supported by splined rods 119. The bracket 127 has pins (not shown) which extend into the splines of the splined rods 119. The bracket 127 and the cage 113 connected to it are movable vertically by a 27 volt motor 131 (FIG. 6) which operates through a chain stabilized by the splines. The splines are so shaped that as the bracket 127 is moved upwardly, the splined rods turn about their vertical axes exerting a camming effect on the fingers 119 rotating them out of the way of the bracket (FIG. 7 shows fingers retracted). Clamps 133 are provided to clamp the thrust collar or thrust bearing 123 in the uppermost position. A tapered mandrel 135 (FIG. 7) extends vertically through cage 113. The mandrel 135 is supported in a chuck 137 in the bracket or carriage 127. When the cage 113 reaches the uppermost position, a hydraulic motor 143 (FIG. 6) is energized. The motor drives a pinion (not shown) in casing 139 which engages rack 141 to thrust the mandrel 135 through cage 113. The mandrel is tapered and cams out rolls 112 in cage 113. The mandrel is driven by motor 143 (FIG. 6) through gears (not shown). When the upward movement of the mandrel is started, the rotation of motor 143 is started. As the mandrel moves upwardly, and while in its uppermost position, the mandrel causes the rolls 112 to rotate, rolling the sleeve 52. Since the sleeves are supported only by tube 25, it is necessary to limit the extension of the rolls into the sleeve to prevent blowout of the sleeve and tube. This is accomplished by a stop (not shown) on the thrust bearing that carries the cage 113. This stop engages a thrust bearing (not shown) on the mandrel 135 to stop the upward movement of the mandrel. To preclude overheating of the sleeve and tube 25, the use of the mandrel 135 and its dwell in the upper position is timed.

Another tool which is used in the practice of this invention is the drill tool 151 (FIG. 10A) for drilling out plugs 153. It is believed that a detailed description of the drill tool 151 is unnecessary for the understanding of this invention. Like the other tools 51, 85, 111, the drill tool 151 includes a support having a top plate through which the drill is projected into the plugs 153. The drill tool 151 also has locking pins 71 which are similar and are operated similarly to the locking pins 71 of the other tools. A tachometer 155 (FIG. 10A) provides a feedback signal from the drill. A vertical plate also extends from the horizontal plate with holes for mounting on plate 39 of the coordinate transport 27.

Figure 8:
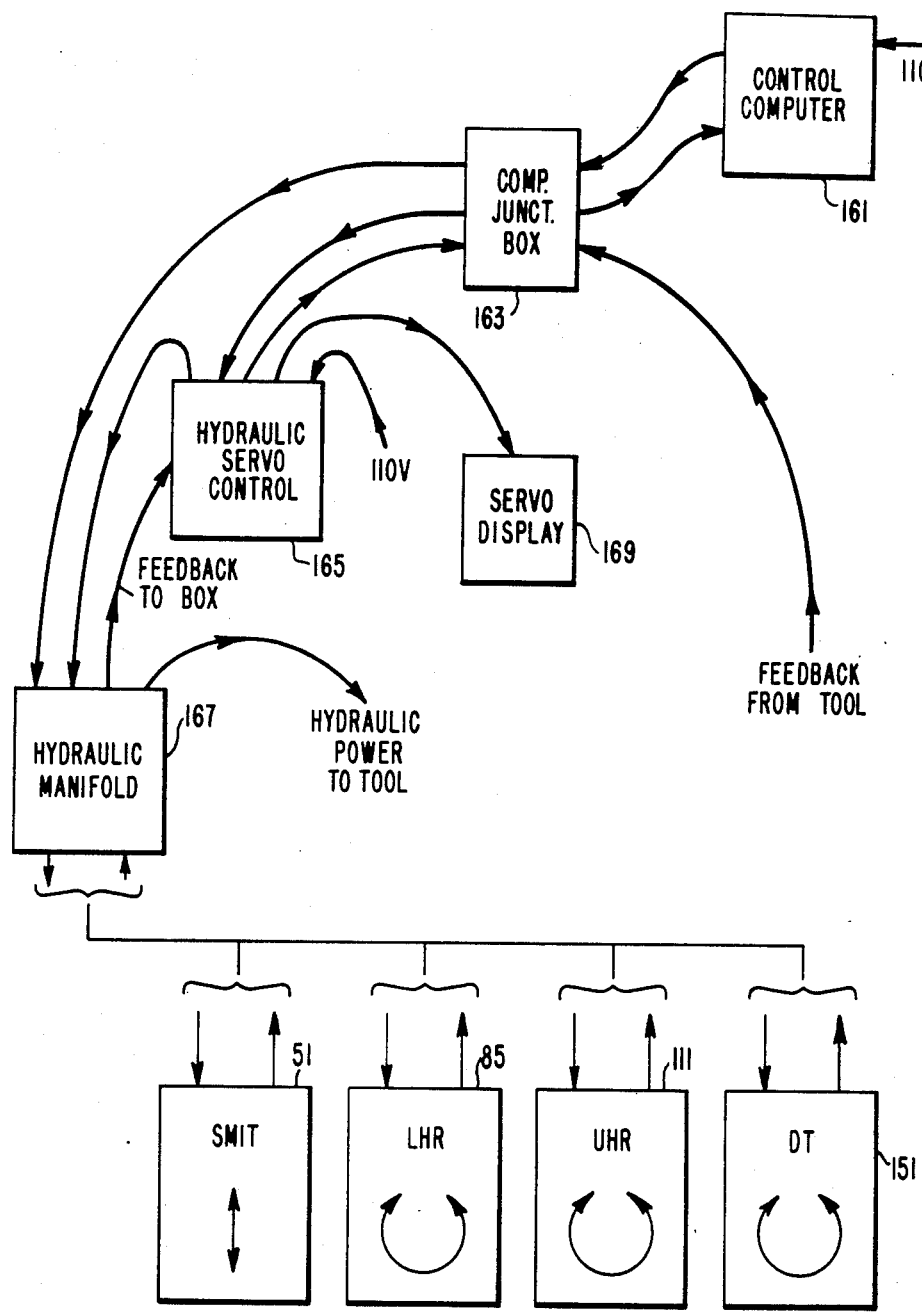
FIG. 8 is a block diagram showing the relationship of the various components which cooperate in the practice of this invention.

The control of the tools will now be described with reference to FIGS. 8, 9A 9B, 10A and 10B. As shown in FIG. 8, the processing according to this invention is carried out under commands from a control computer 161. The commands from the control computer 161 are transmitted through the components junction box 163 to the hydraulic servo control (HSC) 165. Feedback from the hydraulic servo control is also transmitted to the computer 161 through the junction box 163. The hydraulic servo control (FIGS. 9A and 9B) is set to translate the commands from the computer into the desired operations of the tool which is carrying out a process and to process these commands in conjunction with the feedback signals to effectuate the carrying out of the operations. The control includes toggle switch S2 (FIG. 9A) setting the HSC for the tool to be operated, potentiometers P1 through P8 for setting the parameters of operation (speed and force) of the operating members or mechanisms of the tools, and relays K1 through K4 for initiating the operation of the tools. The HSC 165 is interfaced between the computer and the hydraulic manifold 167 as shown in FIG. 8. Signals from the computer 161 are translated by the HSC 165 into instructions transmitted to the hydraulic manifold 167 to regulate the speed, pressure and flow of the hydraulic fluid to the tools 51, 85, 111, and 151, i.e., in each case to the tool selected for operation. The parameters of the flow are fed back to the HSC 165. The apparatus also includes a display 169 for displaying the various parameters. In particular, the magnitude of the insertion force is displayed digitally. The display serves for process control and maintenance.

Figure 9A:
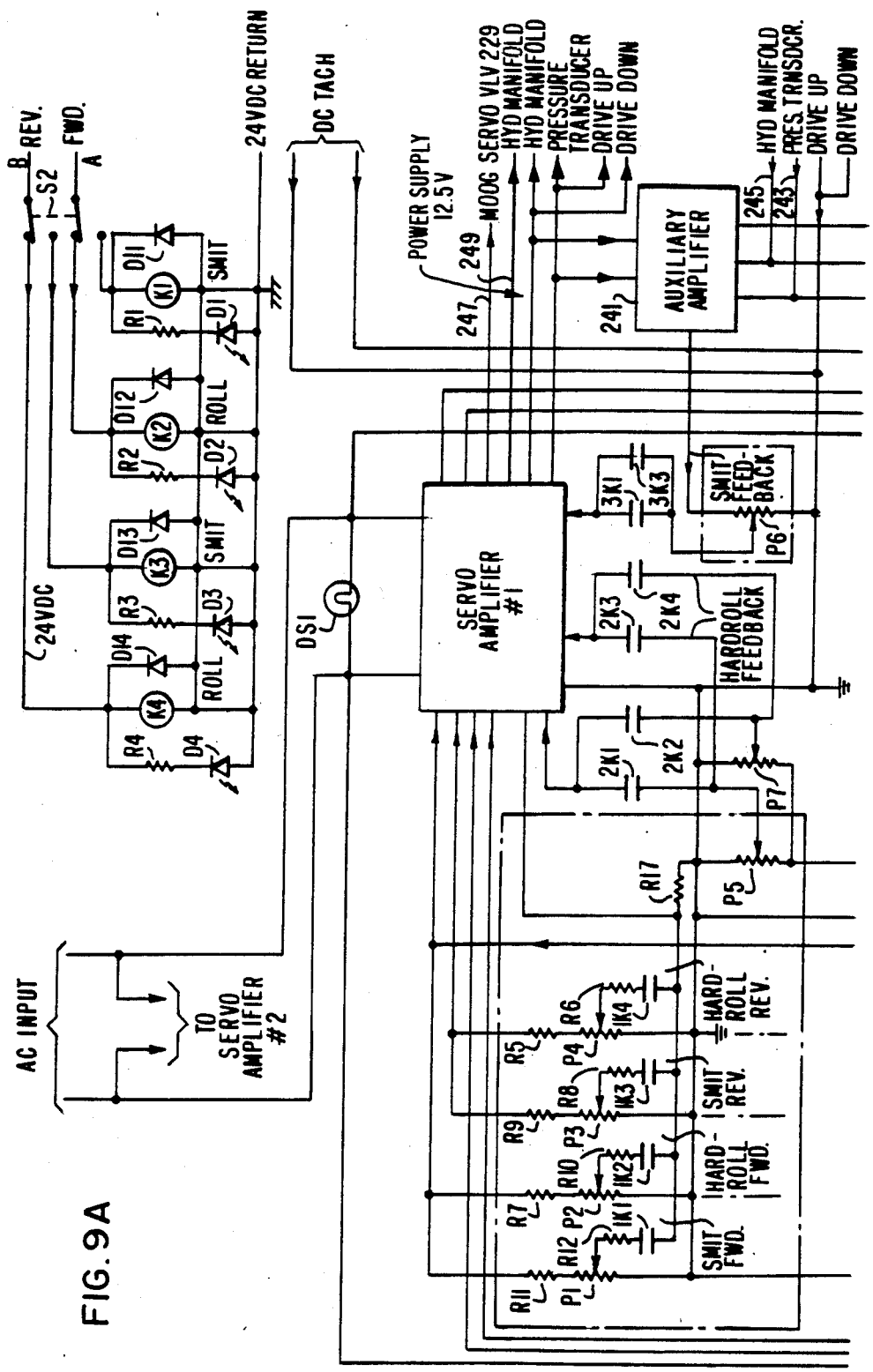
FIGS. 9A and 9B together constitute a schematic showing the electrical components with which the operation of the tools are set in the practice of this invention.
Figure 9B:
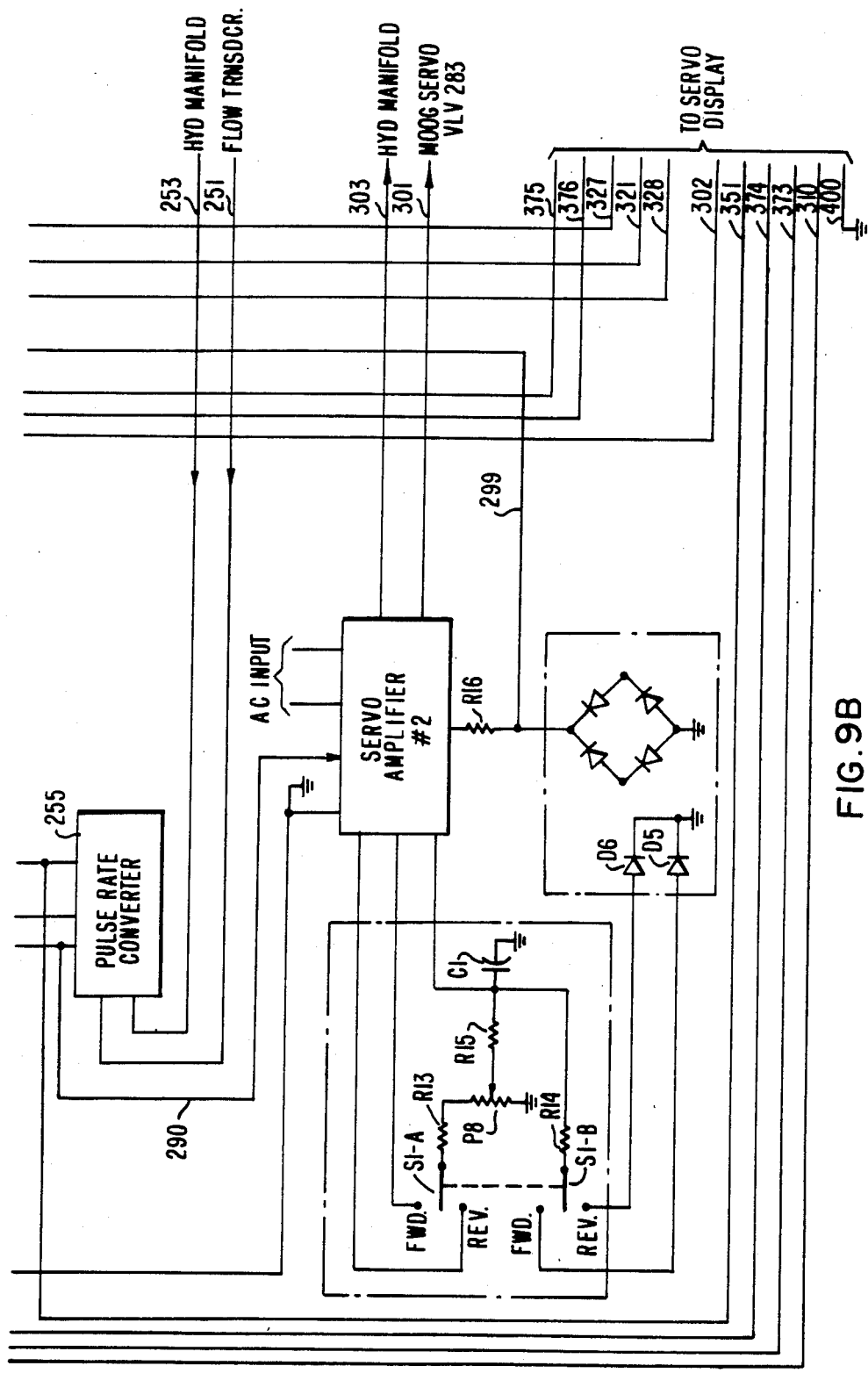

Essentially the hydraulic servo control includes the electrical apparatus shown in FIGS. 9A and 9B. The switch S2 is shown set for hard rolling both high and low. In this setting relays K2 and K4 are selectively energized depending on the command from computer 161. When the computer calls for forward drive, current flows through terminal A, K2 is energized and front contacts 1K2 and 2K2 are closed. Potentiometer P2 is set to set the pressure on the motor 143. Contact 1K2 connects potentiometer P2 to servo amplifier 1 to set the force impressed by motor 143 for the rolling. Servo amplifier 1 is a Moog amplifier 121A132. Contact 2K2 connects potentiometer P7 to servo amplifier 1 to set the speed of the rolling. The setting is selected to preclude unstable operation because of the interaction of the pressure transducers PT1 and PT2 (FIG. 10A), which together are responsive to the force impressed on the motor 143, and the flow transducer FT which responds to the flow of fluid through the motor which determines the speed of the motor.

When the computer commands current to be impressed at terminals B (and not at A), relay K4 is energized and contacts 1K4 and 2K4 are closed. Motor 143 is reversed. The force impressed by the motor is now set by potentiometer P4. The speed continues to be set by P7.

In the lower position, the switch S2 is set to connect terminals B and A for sleeve mandrel insertion tool (SMIT). When the computer calls for current at terminal A, relay K1 is energized and contacts 1K1, and 2K1 and 3K1 are closed. Potentiometers P1, P5 and P6 are connected to servo amplifier 1. The motor 61 (FIG. 1) is driven in the forward direction inserting the sleeve blank in a tube 25. The force of the motor is set by potentiometer P1. The speed of the motor 61 is set by potentiometer P5 which is set and locked in the setting to preclude instability. Potentiometer P5 sets the feedback from the flow transducer FT. Potentiometer P6 sets the feedback from the pressure transducers PT1 and PT2.

When the motor 61 is to be reversed, current is supplied to terminal B (and not A), relay K3 is energized and contacts 1K3, 2K3 and 3K3 are closed. Potentiometers P3, P5 and P6 are connected to set the reverse operation of the motor 61.

The drill tool is controlled through servo amplifier 2 also a Moog 121A132. The force exerted by the drill is set by potentiometer P8. The potentiometer is set for forward and reverse operation by ganged switches S1-A and S1-B.

Diodes D1, D2, D3, D4 and LED's which indicate when the corresponding relays K1, K2, K3, K4 are energized. The circuit shown in FIGS. 9A and 9B is energized from a low voltage supply typically about 24 to 27 volts.

Figure 10A:
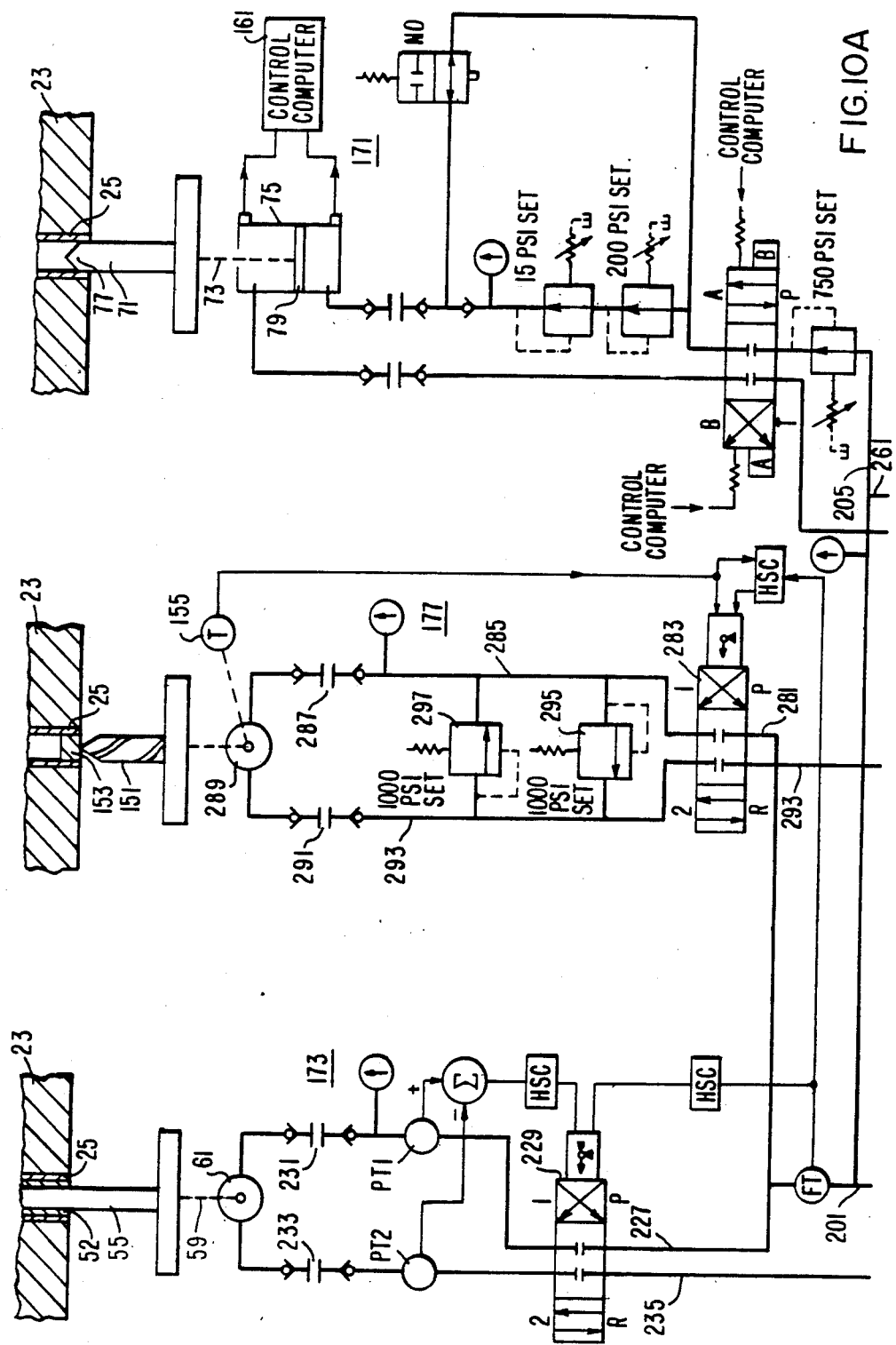
FIGS. 10A and 10B together constitute a schematic showing the control of the tools in the practice of this invention.
Figure 10B:
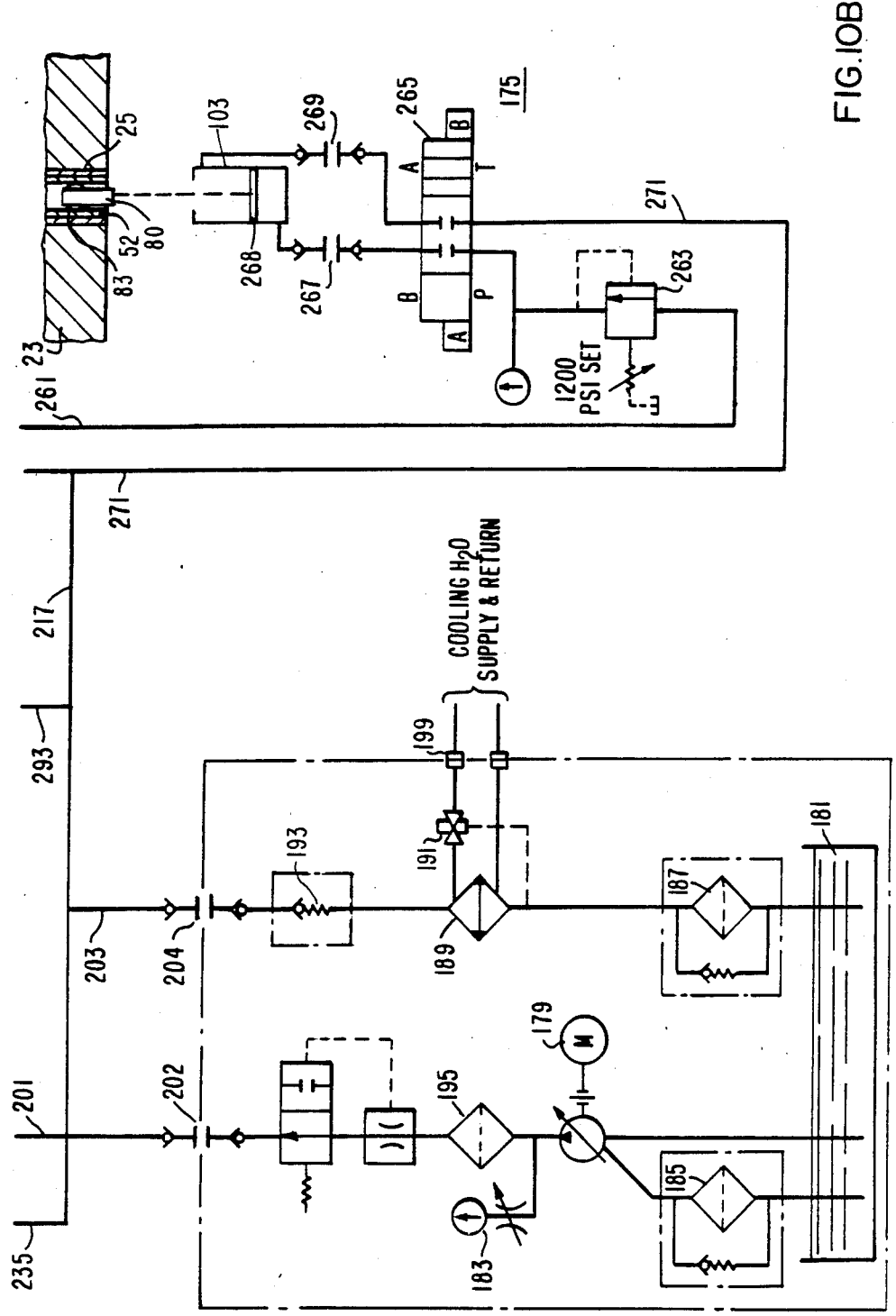

FIGS. 10A and 10B show the hydraulic fluid circuits 171, 173, 175, 177, respectively, for the drive for the locking pins 71, the insertion drive for the SMIT 51 and the rotating drives for the lower and upper rollers 85 and 111, the insertion drive for the lower roller 85 and the rotating drive for the the drill 151. These circuits are supplied from a pump 179 (FIG. 10B). To the extent that they may be of interest, the components shown in FIG. 10B, associated with the pump, are as follows:

181 fluid tank typically 40 gallons
183 pressure gauge
185 line filter
187 line filter
189 heat exchanger
191 water regulator valve
193 check valve
195 pressure filter
199 connector
202-204 quick disconnects The various circuits are for convenience shown as connected to HSC blocks. The blocks are vertically integrated in the HSC 165 and shown in FIGS. 9A and 9B. The fluid for the drives is derived from main lines 201 and 203 through quick disconnects 202 and 204. Reference is made to the Parent application Ser. No. 538,309 for description of control of the locking pins 71.

The motor 61 for the SMIT 51, the motor 105 (FIG. 4) for the lower hard roller of tool 85, and the motor 143 (FIG. 6) for the upper hard roller of tool 111, each is supplied in the forward direction from line 201. For SMIT the flow is through flow transducer FT, conductor 227, servo valve 229, pressure transducer PT1, disconnect 231, motor 61, disconnect 233, pressure transducer PT2, servo valve 229, conductor 235, to line 203. In the reverse direction, the flow is from line 203 to line 201 along a like path. In position R the servo valve 229 passes fluid in the forward direction and in position P in the reverse direction.

The transducers PT1 and PT2, and FT and servo control valve 229, are in the hydraulic manifold 167 (FIG. 8). The transducers produce electrical voltage signals, in dependence upon the pressure and flow. The feedback signal to the hydraulic servo control 165 is, as shown in FIGS. 10A and 10B, the difference between the signal from PT1 and the signal from PT2. This difference signal measures the pressure across the motor 61 and is impressed on the auxiliary amplifier 241 (FIG. 9A) in the hydaulic servo control through conductors 243 and 245. The auxiliary amplifier is a Moog 123–127. The output of auxiliary amplifier 241 is impressed as an input on servo amplifier 1 through potentiometer P6 and either contacts 3K1 or 3K3 depending on whether the flow is forward or reverse. In servo amplifier 1 the feedback signal derived from auxiliary amplifier 241 is compared with the command signal from potentiometer P1 or P3 as the case may be. The ouput of servo amplifier 1 which is the error signal is impressed on servo valve 229 through conductors 247 and 249. The response of servo valve 229 is a continuous function of the error signal; the control or the insertion force is smooth so that the sleeve blank is moved without undesired interruptions or jerks into a tube 25.

The feedback signal from the flow transducer FT is a pulse of variable frequency. This signal is impressed, through conductors 251 and 253 (FIG. 9B), on a pulse-rate converter 255 which converts the pulses into a voltage dependent on the frequency of the pulses. The pulse-rate converter 255 is a PRC pulse rate converter 101-KY of Flow Technology Inc., Phoenix, Ariz. With the apparatus set for SMIT, the resulting voltage signal is impressed through contact 2K1 on servo amplifier 1 through potentiometer P5 if the flow is forward and through 2K3 if the flow is reverse.

If the apparatus is set for upper or lower hard rolling, the signal is impressed on servo amplifier 1 through potentiometer P7 and contact 2K2, if the flow is forward, and contact 2K4 if the flow is reverse. Potentiometers P5 and P7 are set so that the operation is stable and locked in this setting. In this case also the output of servo amplifier 1 is impressed on the servo valve 229.

For low hard rolling the cage or tube 113 and the mandrel 86 are advanced into the sleeve by a hydraulic cylinder 103 (FIG. 10B) rather than a low-voltage motor as is the case for high hard rolling. A hydraulic cylinder is suitable for this purpose because the displacement of the cage 80 and mandrel 86 is relatively short.

To advance the cage 80 and mandrel 86 into the sleeve 52 in a tube 25, the cylinder 103 of the lower hard-roll tool is supplied in a fluid circuit from line 201, through conductor 205, conductor 261, pressure regulator 263, directional control valve 265, disconnect 267, cylinder 103 (below piston 268), then from above piston 268 through disconnect 269, valve 265, conductor 271, conductor 217 to line 203. Directional control valve 265 is identical to directional control valve 209, of locking pin circuit 17 (parent application). Regulator 263 blocks the flow of fluid to the cylinder 103 until the pressure of the fluid is a preset magnitude, typically 1200 psi. The fluid flows forwardly, in the circuit traced above, with solenoid A of the valve 265 energized and reversely with solenoid B energized. The regulator 263 and the directional control valve 265 are in the hydraulic manifold 167 (FIG. 8). The high hard roller is controlled similarly to the low hard roller.

The drill tool is supplied in a circuit extending from line 201, through the flow transducer FT, conductor 281, servo control valve 283, conductor 285, disconnect 287, drill motor 289, disconnect 291, servo control valve 283, conductor 293, conductor 217 to line 203. Servo control valve 283 is identical to servo control valve 229 and like the latter is in the hydraulic manifold 167. Regulators 295 and 297 are connected oppositely between conductors 285 and 293. Their purpose is to protect the motor 289 from excessive pressure. If the pressure in the forward direction exceeds a predetermined magnitude, typically 1000 psi, regulator 295 bypasses the motor. If the pressure in the reverse direction exceeds the magnitude, regulator 297 bypasses the motor 289. The regulators 295 and 297 are in the manifold 167 (FIG. 8).

The supply to motor 289 is regulated by feedback from tachometer 155 and from the flow transducer FT (FIGS. 10A and 10B). The tachometer output is impressed on servo amplifier 2 (FIGS. 9A and 9B) through conductor 299 and resistor R16. The signal from the flow transducer FT converted by the pulse-rate converter, is also impressed on servo amplifier 2 through conductor 290. Servo amplifier 2 is a Moog 121A132. The feedback signal from the tachometer is compared to the preset magnitude from potentiometer P8 in servo amplifier 2. The resulting error signal is impressed on servo control valve 283 through conductors 301 and 303. The signal from the flow transducer FT serves as a secondary check that the flow meets the demand set in the computer 161. The effect of this control by the flow transducer and the tachometer 155 governed by computer 161 is to maintain the speed-to-feed ratio of the drill constant. The computer sets the drive up voltage so that the chip-cut depth per revolution of the drill 151 is constant, typically about 0.127 millimeters per revolution. It is desirable to maintain constant speed-to-feed ratio because by this process maximum efficiency is achieved, i.e., there is a maximum material-removal rate with a minimum cutting edge wear and power consumption.

The conductors 375, 376, 327, 321, 328, 302, 351, 374, 373, and 310 (FIGS. 9A and 9B) supply intelligence to the servo display 169 (FIG. 8). Conductor 400 provides a common ground for the display.

While preferred embodiments of this invention have been disclosed herein, many modifications thereof are feasible. This invention is not to be restricted except insofar as is necessitated by the spirit of the prior art.

We claim:

1. Apparatus for processing a damaged tube of a steam generator of a nuclear-reactor plant, the said tube extending into a tube sheet of the generator, the said apparatus including a tool having:
   (a) means to be actuated, for processing a tube,
   (b) a fluid-driven motor, connected to said processing means, for actuating said processing means to process said tube, and
   (c) tool-supporting means, to be inserted in tubes in said tube sheet which are adjacent to said tube to be processed, said tool-supporting means to be locked in said adjacent tubes with said processing means in position to process said tube to be processed;
   the said apparatus also including the following cooperative components operable when said processing means is in position to process said tube;
   (d) fluid-supply means, including fluid supply lines connected to said motor, for driving said motor,
   (e) pressure-transducer means, connected to said fluid-supply lines, for sensing the pressure of the fluid in said supply lines to produce a signal dependent on the pressure sensed,
   (f) control means, connected to said fluid-supply lines, for controlling the pressure of the fluid driving said motor, and thus the force exerted by the motor, and
   (g) means, connected to said pressure-transducer means and to said control means, and responsive to said signal, for actuating said control means to maintain the pressure of the fluid driving the motor at a magnitude consistent with, and with the precision demanded by, the process requirement and without damage to the tube to be processed, to said tool or to the combination of the tube to be processed and other processing parts.

2. Apparatus for sleeving with sleeve blanks the tubes of the steam generator of a nuclear-reactor plant, the said tubes extending into a tube sheet of the generator, the said apparatus including a sleeving tool having:
   (a) means for engaging a sleeve blank to be driven into a tube, (b) a fluid-driven motor connected to said engaging means for actuating said engaging means to drive said sleeve blank into said tube, and (c) tool-supporting means, to be inserted in tubes in said tube sheet, which are adjacent to said tube to be sleeved, said tool-supporting means to be locked in said adjacent tubes with said engaging means in position to sleeve said tube to be sleeved;

the said apparatus also including the following cooperative components operable when said sleeving means is in position to sleeve said tube:

(d) fluid supply means including fluid-supply lines connected to said motor, for driving said motor, (e) pressure-transducer means, connected to said fluid-supply lines, for sensing the pressure of the fluid in said supply lines to produce a signal dependent on the pressure sensed, (f) control means, connected to said fluid-supply lines, for controlling the pressure of the fluid driving said motor and thus the force exerted by the motor, and (g) means, connected to said pressure-transducer means and to said control means, and responsive to said signal, for actuating said control means to maintain the pressure of the fluid driving the motor at a magnitude consistent with, and with the pressure demanded by, the sleeve insertion and without damage to the sleeve blank or to the tube to be sleeved or to said tool.

3. The apparatus of claim 2 wherein the supply lines include a first line conducting fluid to the motor pressure-transducer means includes a first pressure-transducer for sensing the pressure in said first line and a second pressure-transducer for sensing the pressure in said second line and the said apparatus also includes menas, connected to said first and second transducers, for deriving, as the signal dependent on the pressure sensed, the difference between the pressure sensed by the first pressure transducer and the pressure sensed by the second pressure transducer.

4. The apparatus of claim 3 wherein the means for deriving a signal dependent on the pressure sensed derives an electrical signal corresponding to the difference between the response of the first transducer and the response of the second transducer and the actuating means includes:

(a) means for producing a command electric signal corresponding to the desired drive of the motor;

(b) means for comparing said electrical signal dependent on the pressure sensed and said command electrical signal to derive an error signal; and (c) means, responsive to the error signal, for actuating the control means.

5. The apparatus of claim 2 wherein the control means includes a servo valve whose response varies continuously in dependence upon the response of the pressure-transducer means.

6. The apparatus of claim 4 wherein the control means includes a servo valve whose response varies continuously in dependence upon the error signal.

7. The apparatus of claim 2 including, in addition to the pressure-transducer means, a flow transducer for sensing the flow rate of the pressure fluid and also including means, connecting said flow transducer to said control means, to control the speed of the motor and thereby to control the velocity at which the processing means processes said tube.

8. The apparatus of claim 2 including, in addition to the pressure-transducer means, a flow transducer, said flow transducer being located at a position separate from the sleeving tool whereby the tool weight is minimized.

9. The apparatus of claim 7 wherein the flow transducer produces a flow electrical signal and wherein the control means includes means for producing a command electricl signal and the actuating means includes means for comparing the flow electrical signal and the command electrical signal and controlling the velocity at which the processing means processes said tube in dependence upon the result of this comparison.

10. The apparatus of claim 2 including in addition to the means for inserting a sleeve in the damaged tube of the steam generator, roll means and means for rotating the roll means in processing engagement with said inserted sleeve at a predetermined region of the sleeve to roll in said sleeve and seal said sleeve to the damaged tube.

* * * * *